H. G. LYKKEN.
EMERGENCY TIRE.
APPLICATION FILED OCT. 26, 1918.
1,357,788.
Patented Nov. 2, 1920.
2 SHEETS—SHEET 1.
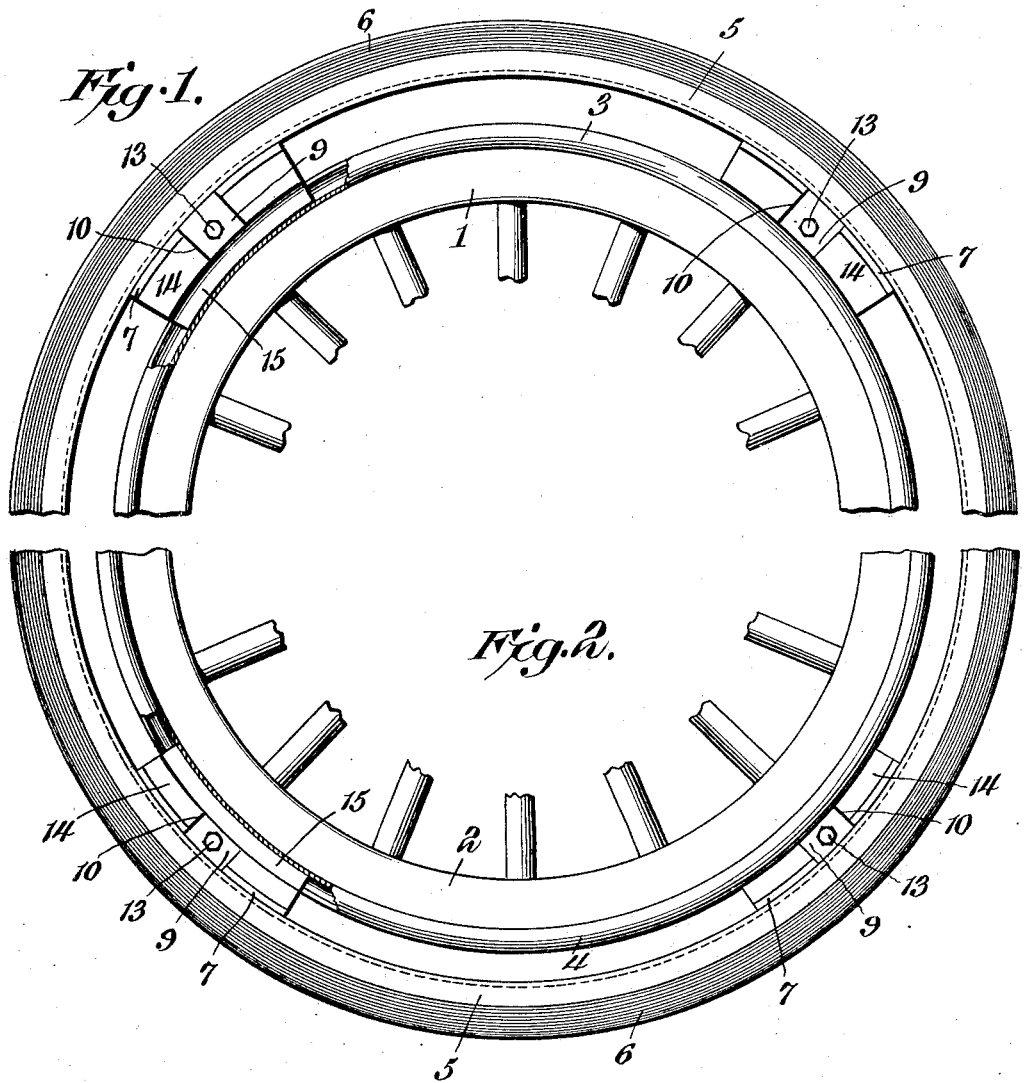
WITNESSES
Howard D. Orr
H. T. Chapman
Henry G. Lykken, INVENTOR,
BY
ATTORNEY

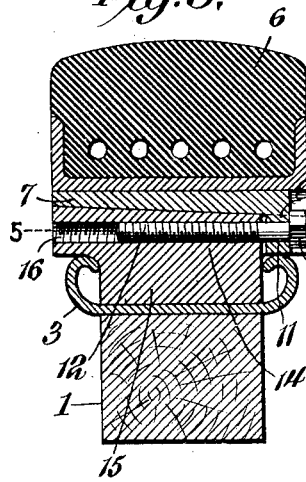
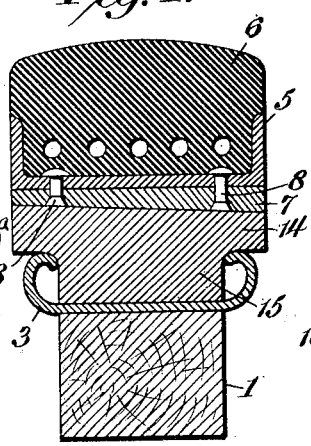
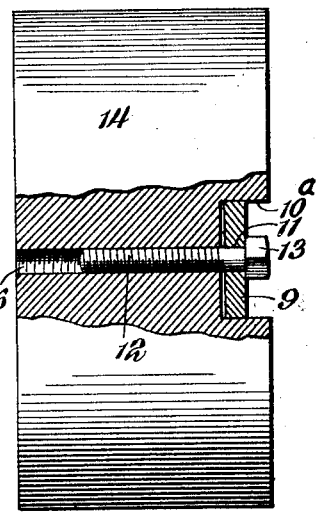
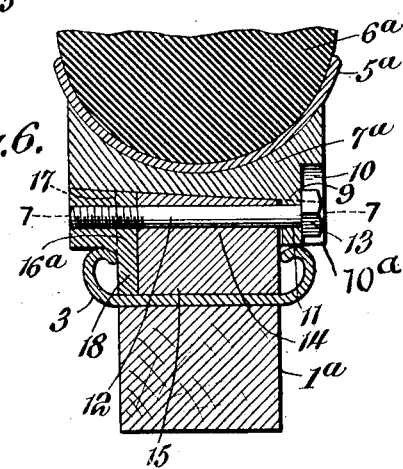
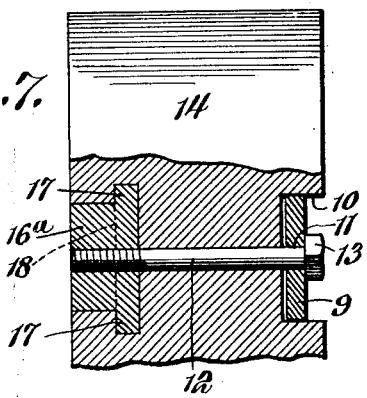
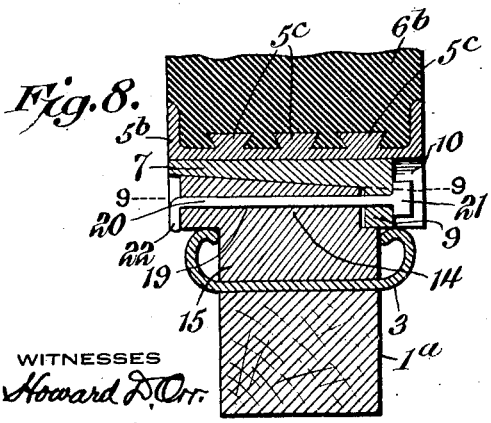
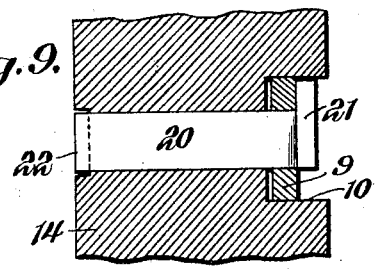

UNITED STATES PATENT OFFICE.

HENRY G. LYKKEN, OF MINNEAPOLIS, MINNESOTA.

EMERGENCY-TIRE.

1,357,788.  Specification of Letters Patent.  Patented Nov. 2, 1920.

Application filed October 26, 1918. Serial No. 259,838.

*To all whom it may concern:*

Be it known that I, HENRY G. LYKKEN, a citizen of the United States, residing at Minneapolis, in the county of Hennepin and State of Minnesota, have invented a new and useful Emergency-Tire, of which the following is a specification.

This invention has reference to emergency tires, and is intended more particularly for use in an automobile as an emergency tire in connection with the clencher type of wheels such as are used upon the Ford and other makes of automobiles.

The repair and replacing of clencher tires on the road is a laborious and disagreeable task, of difficult accomplishment, taking considerable time and it is frequently a dirty job. In order to avoid these disagreeable conditions, it has been proposed to provide demountable tires which may be removed and replaced by the manipulation of a few bolts. For automobiles equipped, as is the Ford automobile, with front and rear wheels of different sizes, it is necessary to replace the standard equipment with an entirely new set of wheels and rims, including a fifth rim for an extra tire in order that the rims and tires may all be of the same size so as to be interchangeable.

With the present invention the standard equipment of the Ford automobile, and other automobiles of like character, is not disturbed and all that is necessary to supply is a single rim and a single tire with attaching means, whereby the emergency rim and tire is interchangeable on the wheels irrespective of the fact that the wheels and rims are of different diameters.

The invention comprises a rim with a tire thereon, either solid or cushion or pneumatic, as desired, which rim will fit either the front or rear wheels of the automobile, and filling and holding means are provided for properly spacing and securing the rim, with the tire thereon, with respect to the clencher rim already in place on the wheel. With such an equipment, all that is necessary is to remove the damaged tire and slip the emergency tire onto the rim, either the front or rear rim, as the case may be, and fasten it in place with a suitable number of bolts, say four or five bolts.

With a pneumatically equipped vehicle the emergency tire is intended only for emergency purposes, to be replaced by the original tire as soon as may be. For trucks and other vehicles employing solid tires, the emergency rim and tire, if a solid tire be used, may remain on the vehicle an indefinitely long time.

The invention will be best understood from a consideration of the following detailed description taken in connection with the accompanying drawings forming a part of this specification, with the understanding, however, that the invention is not confined to any strict conformity with the showing in the drawings, but may be changed and modified so long as such changes or modifications mark no material departure from the salient features of the invention as expressed in the claims.

In the drawings,

Figure 1 is an elevation of a portion of a wheel equipped with the invention, some parts being shown in section;

Fig. 2 is a view similar to Fig. 1 but showing the application of the invention to a wheel of a different size from that of Fig. 1;

Fig. 3 is a cross section of a wheel equipped with the invention, the section being taken through one of the holding bolts or screws;

Fig. 4 is a similar section taken at a short distance from the section of Fig. 3;

Fig. 5 is a section on the line 5—5 of Fig. 3, with some portions shown in elevation;

Fig. 6 is a section similar to Fig. 3 but showing a somewhat modified form of the invention;

Fig. 7 is a section on the line 7—7 of Fig. 6, with some portions shown in elevation;

Fig. 8 is a view similar to Fig. 3 but showing still another form of the invention; and Fig. 9 is a section on the line 9—9 of Fig. 8.

Referring to the drawings, there is shown in Fig. 1 a wheel 1 and in Fig. 2 another wheel 2, the wheel 1 representing one of the rear wheels of a Ford automobile and the wheel 2 representing one of the front wheels of a Ford automobile, the front and rear wheels differing in diameter by about one inch, and the standard equipment of tires also differing in diameter correspondingly. The wheels are provided with the clencher type of rims indicated at 3 and 4, respectively, differing in diameter in like manner to the bodies of the wheels.

There is also provided another rim 5 which may be of channel form, and mounted in such rim 5 is a tire 6. In Figs. 3 and 4 the rim 5 is a plain channel with parallel sides and the tire 6 is a solid rubber tire of suitable type permanently mounted in the rim 5. The inner diameter of the rim 5 is considerably greater than the outer diameter of the rim 3, whereby to accommodate certain structures to be described. But the external diameter of the tire 6 may correspond to the external diameter of a standard pneumatic tire such as is used on the Ford automobile.

At suitable intervals about the inner periphery of the rim 5 wedge blocks 7 are made fast in any suitable manner, as by rivets 8, the taper of the wedge blocks 7 extending from side to side of the rim 5. Each wedge block 7 is provided at the thick end with an inset lip 9 extended toward the axis of the rim 5, thereby producing a recess or cut-out 10. The lip 9 has a perforation 11 through it for a screw 12 having a head 13 entering the recess 10 so as to be flush, or nearly so, with the corresponding side face of the rim 5.

There are also provided as many wedge blocks 14 as there are blocks 7, and in each block 14 there is produced a recess $10^a$ to receive the lip 9. The blocks 7 and 14 are elongated circumferentially of the rim 5 and have a curvature conforming thereto.

In the particular showing of the drawings the tire 6 with the rim 5 is somewhat wider than the clenched rim 3 or 4 so as to overhang it at the sides, in like manner to the overhang of a pneumatic tire. The blocks 7 and 14 similarly overhang the rim 3 or 4, as the case may be, while that portion of each block 14 toward the center of the wheel is of reduced width to form a tongue or projection 15 of a width to snugly fit between the side flanges of the rim 3 or 4, as the case may be. Each block 14 has a suitably tapped perforation 16 to receive the screw 12, or in the case that bolts be used, the perforation 16 may not be tapped.

When a puncture or blow-out occurs in the ordinary pneumatic tire equipment, the damaged tire is removed in the usual manner and the emergency tire may replace it. To do this, a suitable number of blocks 14 are placed in the rim 3 or 4, as the case may be, and properly spaced, the blocks fitting snugly between the side flanges of the rim so that they will retain the positions in which they are placed. Now, the emergency rim is so positioned with respect to the blocks 14 that the emergency rim may be moved onto the outer beveled or wedge surfaces of the blocks 14 from the outer face of the wheel. The arrangement is such that this movement may be accomplished with ease, it being understood, of course, that the wheel is jacked up, and the beveled faces of the blocks 7 and 14 will contact just before the emergency rim reaches its final position. Then the screws or bolts 12 are inserted and turned tight, thereby engaging the lips 9, thus forcing the blocks 7 into tight engagement with the blocks 14 and centering and holding the emergency rim and tire in place.

The whole operation may be performed in a very few minutes with the labor of forcing a tire onto a clencher rim entirely eliminated, and the greater portion of the dirty work accompanying the removal, repair and replacing of pneumatic tires on the road, avoided. A solid tire may be very satisfactorily used for emergency purposes, permitting the automobile to be run for relatively long distances, sufficient to complete a journey or to reach some place where repairs may be conveniently made.

The only difference between the equipment of the front and rear wheels is in the radial thickness of the blocks 14. The number of pairs of blocks 7 and 14 may be as low as four, but a greater number may be employed if desired. The length of the blocks should be sufficient to properly support the rim, and such length will depend upon the number of pairs of blocks used. The screws and contacting wedge surfaces permit a sufficiently tight fit and sufficient frictional engagement to avoid all creeping. Moreover, the emergency rim is locked to the blocks 14 by the lips 9 so that the blocks must maintain their relative positions at all times. The blocks may be made of wood or other material, including metal, and by making the blocks 14 of different radial thicknesses and providing two sets of blocks, one for the front wheels and the other for the rear wheels, the emergency rim may be secured to either the front or rear wheels indifferently.

In the arrangement shown in Figs. 3, 4, and 5, a screw 12 is employed to hold the two blocks of each pair together. In the structure shown in Figs. 6 and 7, the block 14 has a nut $16^a$ set into it, the nut being provided with side flanges 17 and a tongue 18 seating the nut in the tongue portion 15 of the block so that it will retain its place at all times. With the structure shown in Figs. 6 and 7, the block 14 may be very conveniently made of wood with the nut $16^a$ of metal.

In Fig. 6 the block 7 is replaced by another block $7^a$, suitably journaled on the outer face to receive a concave rim $5^a$, permitting the use of a tire $6^a$ of different cross sectional shape than the tire 6.

In Figs. 8 and 9 a rim $5^b$ is provided with dove-tailed ribs $5^c$ on the interior holding a tire $6^b$ which may be of similar shape to the tire 6 but conforming to the ribs $5^c$. The structure shown in Figs. 8 and 9 has blocks 7 and 14 which may be generally the same as those shown in Figs. 3 and 4, but instead of providing a screw or bolt for securing the blocks together, the lip 9 and block 14 have matching passages 19 therethrough traversed by a flat key 20 with a head 21 at one end for engaging the lip 9, while the other end 22 of the key is of sufficient length and the key is made of suitable materials permitting the end 22 to be turned over against the corresponding portion of the block 14, thereby locking the parts in place. The turning over of the key and the drawing of the wedge portion of the blocks into tight engagement may be accomplished by the use of a hammer, or other like tool, and an anvil of any suitable character.

It will be understood that the showing is but indicative of many forms which the invention may assume, the invention being intended to provide an emergency tire and rim ready for application in case of need, requiring, in types of automobiles represented by the Ford automobile, but a single emergency tire without any change whatever in the standard equipment of the vehicle.

Ordinarily the tire or tread of the emergency rim is of the solid type, but, of course, it is evident that a cushion or pneumatic tread may be substituted for a solid tread. Where the standard equipment of the vehicle is made by solid tires, the emergency equipment may follow the type of solid tire employed and, in such case, the early exchange of a pneumatic tire for the solid tire is not necessary since the emergency tire may be retained as long as desirable.

The wedge blocks 7 are, in effect, permanent parts of the emergency rim, while the wedge blocks 14 are separate members to be placed in the standard rim when it is necessary to apply the emergency tire. The tightening of the emergency rim on the standard rim is accomplished by force applied parallel to the axis of the rotation of the wheel but acting perpendicularly to such axis to wedge the emergency rim in place and hold it against creeping circumferentially of the wheel and displacement sidewise of the wheel.

What I claim is:

1. An emergency tire structure for application to vehicle wheels provided with clencher rims, comprising an outer rim with a tread fast thereto and having a series of spaced wedge blocks fast to the inner face of the outer rim, and other wedge blocks separate from and insertible in the clencher rim in matching relation to the wedge blocks on the outer or emergency rim, and means for forcing the wedge blocks together in a direction substantially parallel with the axis of the wheel.

2. An emergency tire structure for vehicle wheels provided with clencher rims, comprising a rim with a tread fast thereto and with spaced blocks on the inner face of the rim having wedge surfaces arranged transversely to the rim, other wedge blocks separate from the emergency rim and provided with tongues adapted to enter between the side flanges of the clencher rim, the wedge blocks having their wedge surfaces arranged to engage and be brought together in a direction parallel to the axis of the wheel, and fastening means for traversing the blocks of both sets and forcing the wedge surfaces into wedging engagement.

3. An emergency tire equipment for application to vehicle wheels having clencher rims thereon, comprising a rim with a tread portion fast thereto and a circular series of blocks fast to the inner face of the rim, said blocks having inner taper surfaces extending transversely of the rim and each block having an axially extending lip at the large end, and a corresponding series of blocks with outer wedge surfaces extending transversely of the blocks for engagement with the wedge surfaces of the first named blocks, said second named blocks being shaped to enter the channel of the clencher rim, and fastening means for extending through the lip of each first named wedge block and into each companion wedge block of the second group for fastening each pair of blocks together with the wedge surfaces in wedging relation.

4. A tire structure comprising a rim with a tread carried thereby, a circular series of pairs of associated wedges with the wedges of each pair in radial order and one of the wedges of the pair fast to the inner face of the rim, and means traversing the other wedges for moving the wedges in lines substantially parallel with the axis of the tire structure.

5. An emergency tire structure for wheels having clencher rims, comprising a rim of greater diameter than the clencher rim for location exterior to the clencher rim and carrying a tread, a circumferential series of wedge blocks fast to the inner circumference of the second-named rim with the wedges extending transversely thereof, other wedges insertible in the clencher rim in matching relation to the first-named wedges, and fastening means traversing the wedges of each series for holding them together and causing them to grip the outer rim to the clencher rim.

6. A tire structure comprising a rim with a tread carried thereby, a circular series of associated wedge blocks extending peripherally of the rim with the wedge surfaces crosswise of the rim, one wedge block of each pair being fast to the inner face of the rim and provided at the large end with a radial extension overlapping the small end of the other wedge block, and drawing means extending through the wedge blocks of each pair for moving one wedge block onto the other in the wedging direction crosswise of the tire structure.

In testimony that I claim the foregoing as my own I have hereto affixed my signature in the presence of two witnesses.

HENRY G. LYKKEN.

Witnesses:
  FRED W. CRAM,
  E. C. RAMSTAD.